United States Patent [19]

Hausheer

[11] 4,197,100

[45] Apr. 8, 1980

[54] FILTERING MEMBER FOR FILTERS

[76] Inventor: Hans P. Hausheer, Im Jörlisbül, 9475 Sevelen, Switzerland

[21] Appl. No.: 899,417

[22] Filed: Apr. 24, 1978

Related U.S. Application Data

[63] Continuation of Ser. No. 739,346, Nov. 5, 1976, abandoned.

[30] Foreign Application Priority Data

Jun. 14, 1976 [CH] Switzerland ............... 007530/76

[51] Int. Cl.² ........................................... B01D 46/02
[52] U.S. Cl. .......................................... 55/382; 55/483; 55/484; 55/486; 55/491; 55/497; 55/528
[58] Field of Search ............... 55/341 R, 381, 382, 55/483, 484, 486–489, 491, 497, 524, 527, 528, DIG. 12, DIG. 16; 210/505, 507, 509, 490, 491; 28/107, 112

[56] References Cited

U.S. PATENT DOCUMENTS

| 853,981 | 5/1907 | Kneuper | 210/491 |
|---|---|---|---|
| 1,349,112 | 8/1920 | Weiss | 210/505 |
| 2,133,141 | 10/1938 | Holm-Hansen | 55/381 |
| 2,135,100 | 11/1938 | Campbell | 55/487 |
| 2,339,431 | 1/1944 | Slayter | 28/107 |
| 2,906,371 | 9/1959 | Jones | 55/381 |
| 2,910,763 | 11/1959 | Lauterbach | 55/527 |
| 2,970,365 | 2/1961 | Morgenstern | 28/112 |
| 3,066,061 | 11/1962 | Winslow | 55/524 |
| 3,208,205 | 9/1965 | Harms et al. | 55/487 |
| 3,337,387 | 8/1967 | Owen | 28/107 |
| 3,422,602 | 1/1969 | Janson | 55/381 |
| 3,774,375 | 11/1973 | Smith | 55/483 |
| 3,807,147 | 4/1974 | Schoonen et al. | 55/483 |
| 3,836,422 | 9/1974 | Bischoff | 28/112 |
| 4,093,437 | 6/1978 | Ichihara et al. | 55/487 |
| 4,113,535 | 9/1978 | Lefkowitz et al. | 28/112 |

FOREIGN PATENT DOCUMENTS

| 2210122 | 9/1973 | Fed. Rep. of Germany | 28/107 |
|---|---|---|---|
| 849263 | 9/1960 | United Kingdom | 55/491 |

OTHER PUBLICATIONS

Hans Dietrich Dust Filtration with Needle Felts, pp. 373, 438–443, Jul./Aug. 1972, Filtration & Separation.

Primary Examiner—David L. Lacey
Attorney, Agent, or Firm—Haseltine, Lake & Waters

[57] ABSTRACT

A filter assembly for the filtration of a liquid or gaseous substance comprising a frame and a plurality of filter members fitted in the frame in parallel relation to one another. Each filter member consists of two elements connected together to form a hollow interior, the substance to be filtered being introduced at one side of the filter and passing through the hollow interior and then through the filter elements for discharge between adjacent filter elements of adjoining filter memers. Each filter element comprises a layer of fiber glass and at least one fleece layer, the two layers being connected by needle felting together at locations between the connections of the filter elements constituting the filter member.

5 Claims, 3 Drawing Figures

FILTERING MEMBER FOR FILTERS

CROSS-RELATED APPLICATION

This application is a continuation of Ser. No. 739,346 filed Nov. 5, 1976 (now abandoned).

FIELD OF THE INVENTION

The present invention relates to a filter for the filtration of a liquid or gaseous substance, in which filter a plurality of filter members are fitted parallel to one another in a frame, each filter member consisting of two single filter elements bonded together, and wherein the substance to be filtered is introduced at one side into the filter and leaves the same by passing completely through the single filter element and is discharged between two adjacent filter elements of adjoining members.

BACKGROUND OF THE INVENTION

Filter elements of the above type are known and used in the filtration of air, for example, in air conditioning apparatus. The two single filter elements form a bag and in most cases are fleece pads made of synthetic fibers. The flocks used in them as the raw material are carded and thus converted into a gauze. This gauze is then fed into panels and when it has reached the desired final weight, the panels are stapled.

For the filtration of air, a layer of glass fibers is used and this layer is covered on one side with a layer of gauze web or needle felt. Two such sandwiched, single filter elements are then placed on one another with their glass strata facing each other and stapled together on three sides along courses running parallel from the open side of the closed end.

Heretofore, it was customary to unite these two single filter elements by sewing or fusing them together at the indicated points. Additional threads still had to be drawn in between every two parallel courses, in order to restrict the size of the opening. In such filter elements there were consequently threads on every side which could not be tucked in and tied up. Furthermore, the production is comparatively expensive, since special sewing machines are required and, additionally, every seam still had to be individually cemented.

SUMMARY OF THE INVENTION

An object of the invention is to provide a filter whose production is simplified and in which the bonding at the points of connection is made more permanent.

In accordance with the invention, this is attained in that each single filter element is a pad of at least one layer and the two single filter elements are connected together by needle felting.

BRIEF DESCRIPTION OF THE DRAWING

One embodiment of the invention is described more fully hereafter with reference to the drawings, wherein.

DETAILED DESCRIPTION

Figure 1:
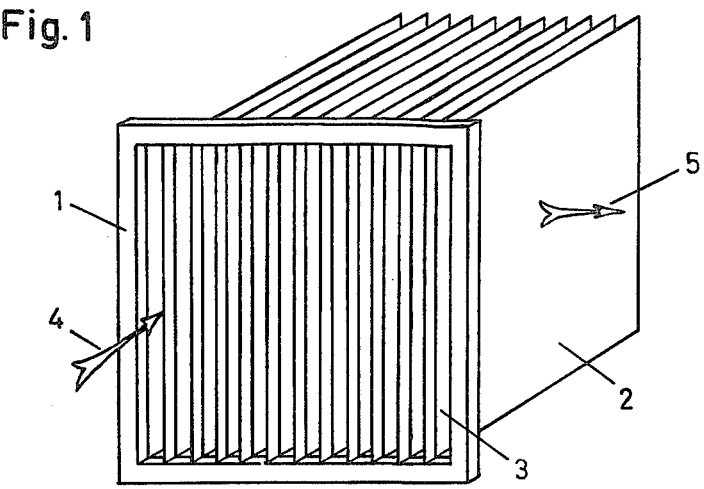
FIG. 1 illustrates, in perspective, a bag filter having a frame and filter members inserted therein.

The bag filter in accordance with FIG. 1 comprises a frame 1, in which a plurality of filter members 2 are inserted such that open ends 3 of filtering members 2 are held in the frame 1. This filter is known in this style and needs not be described in greater detail at this point. In this illustration, the lateral clips and guards have not been shown, since they may vary according to the manufacturer of the equipment and are not significant for the purposes of this invention. The substance to be filtered, for example, air is blown into the open ends 3 of the filter members 2 as indicated by arrow 4 at a speed of 0.5 to approximately 5 meters per second. This produces a pressure through the filter members equivalent to a water column of 4 to 20 mm. This pressure increases with increased fouling of the filter members and may reach a water column equivalent pressure of 50 mm. At a higher pressure, the filter members should be changed, as otherwise no further, or in any case only a very slight, airflow through the filter is possible. The filtered air leaves the filter in the direction shown by arrow 5.

Figure 2:
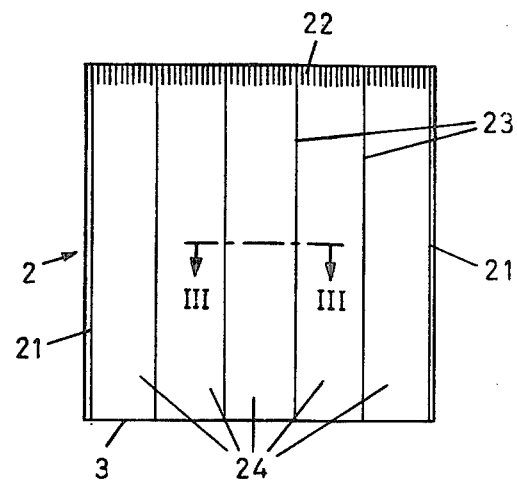
FIG. 2 is a plan view of a filter member.

In FIG. 2 an individual filter member 2 is shown in plan view. The open end 3 is seen at the bottom in FIG. 2, with the closed sides 21 at the left and right edges and a closed end 22 at the top. As shown by lines 23, two single filter elements which constitute the filter member are connected together by needle felting in distinct courses or rows including at least one course at the left and right at sides 21 and in several short portions of a course at the closed third end 22. The filter member 2 is divided by means of several courses (four in the drawing) between the open end 3 in the front and the closed end 22 at the back, to form individual bags 24.

Figure 3:
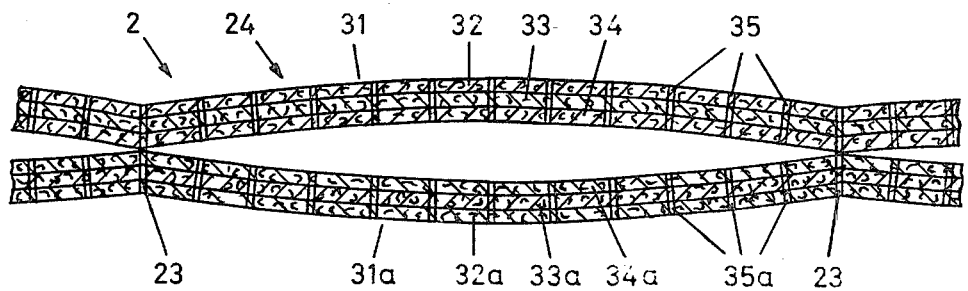
FIG. 3 is a sectional view through a filter member taken along line 111—111 in FIG. 2.

In the cross section in FIG. 3, two single filter elements 31, 31a are illustrated for a bag 24. Each single filter element 31, 31a consists of three layers, namely one outside layer 32, 32a of gauze i.e. a fleece pad and a similar layer 34, 34a on the inside, together with a middle active filtrant layer, 33, 33a sandwiched between them. For example, layers 32, 32a and 34, 34a consist of plastic fibers and the central layer 33, 33a of glass fibers. The gauze layers can contain a binding agent to chemically reinforce the layers. Clearly from FIG. 3, the two single filter elements are held together on their own in several parallel courses 35, 35a. As the two outside layers 32, 32a and 34, 34a are made of gauze, the three layers can be needle felted. The individual bags 24 are formed by joining the two single filter elements 31, 31a in parallel courses 23. While here too the two layers 34 and 34a in contact with each other are made of gauze, it is possible also to join the two single filter elements 31, 31a together by needle felting.

It has been found in filter elements of the prior art that after some time, powdered glass was able to penetrate through the outside layer of gauze. The only explanation for this can be to imagine that the layer of glass fiber which is fastened only by pinning at the seams 23 forming the bags 24, can shuffle about, whereby the glass fibers break up and can penetrate the external gauze in the form of powder. Thus, by embedding the glass fiber layer between the two gauze layers and fastening it many times between those two layers forming the bag, the glass fibers are held fast. In any case, with this new method of execution, powdered glass has never been found to penetrate through the outside layers 32, 32a.

Although the invention has been described for a bag filter, it can also be equally applied to a tubular filter. In such case also, two single filter elements are connected together by needle felting, however, only in two outside courses, so as to form a tube.

What is claimed is:

1. In a high efficiency type filter assembly comprising a pair of opposed substantially coextensive side walls forming major filtering areas, each side wall including a layer of glass fiber and at least one covering layer, said side walls having parallel, longitudinal edges and a transverse edge and being joined together to form at least one bag with an open inlet mouth for entry of the substance to be filtered, said substance passing through the side walls of said at least one bag, the improvement wherein said covering layer consists of a fleece pad disposed on at least one side of said layer of glass fiber, means comprising needle felting joining said covering layer and said layer of glass fiber together in spaced parallel rows in each of said side walls, means comprising a single row of needle felting joining said side walls together and means comprising a plurality of adjacent rows of needle felting extending parallel to said longitudinal edges of the side wall and constituting a fraction of the length thereof to form a seam at said transverse edge.

2. In a high efficiency type filter assembly as claimed in claim 1 wherein a plurality of said single rows of needle felting join said side walls together to form a plurality of parallel extending bags.

3. In a high efficiency type filter assembly as claimed in claim 2 wherein two of said covering layers are disposed on opposite sides of each layer of glass fiber whereby each side wall is composed of three layers of material.

4. In a high efficiency type filter assembly as claimed in claim 3 wherein each covering layer is connected to the layer of glass fiber by parallel rows of said needle felting all three layers of each side wall being connected by needle felting in further parallel rows.

5. In a high efficiency type filter assembly comprising a pair of opposed substantially coextensive side walls forming major filtering areas, each side wall including a layer of glass fiber and a covering layer on opposite surfaces of the layer of glass fiber whereby each side wall is composed of three layers of material, said side walls having parallel longitudinal edges and a transverse edge and being joined together to form at least one bag with an open inlet mouth for entry of the substance to be filtered, said substance passing through the side walls of said at least one bag, the improvement wherein each said covering layer consists of a fleece pad, means comprising needle felting joining said covering layers and said layer of glass fiber together in spaced parallel rows in each of said side walls, means comprising a single row of needle felting joining said side walls together, each covering layer being connected to the associated layer of glass fiber by parallel longitudinal rows of said needle felting, all three layers of each side wall being connected by said needle felting in further parallel longitudinal rows, and a plurality of adjacent, parallel, longitudinal rows of needle felting at said transverse edge extending over a fraction of the length of the longitudinal edges to form a seam at said transverse edge.

* * * * *